United States Patent [19]
Waitts et al.

[11] Patent Number: 5,158,845
[45] Date of Patent: Oct. 27, 1992

[54] MULTI-COLORED MATERIAL USING RAINBOW GRATING

[75] Inventors: Robert R. Waitts, West Caldwell; Manuel S. Cueli, Clifton, both of N.J.

[73] Assignee: Crown Roll Leaf, Inc., Paterson, N.J.

[21] Appl. No.: 424,591

[22] Filed: Oct. 20, 1989

[51] Int. Cl.$^5$ ............................................. G02B 5/18
[52] U.S. Cl. .................................. 430/1; 359/22; 359/567; 430/2; 430/321
[58] Field of Search .................... 428/25, 15, 38; 430/290, 295, 1, 2, 321; 156/63; 359/22, 567

[56] References Cited

U.S. PATENT DOCUMENTS

| | | | |
|---|---|---|---|
| 1,787,371 | 12/1930 | Heaton | 428/119 |
| 2,252,821 | 8/1941 | Thompson | 428/13 X |
| 2,793,148 | 5/1957 | West | 428/38 |
| 2,887,806 | 5/1959 | Hassett | 428/26 |
| 4,105,290 | 8/1978 | Quinn | 350/162.22 X |
| 4,142,107 | 2/1979 | Hatzakis et al. | 430/30 X |
| 4,589,686 | 5/1986 | McGrew | 428/916 X |
| 4,716,063 | 12/1987 | Vehara et al. | 428/65 |
| 4,717,221 | 1/1988 | McGrew | 428/916 X |
| 4,743,477 | 5/1988 | Beaver | 428/13 |
| 4,765,724 | 8/1988 | Huichun | 359/567 |
| 4,839,250 | 6/1989 | Cowan | 430/1 |
| 4,856,869 | 8/1989 | Sakata et al. | 359/567 X |
| 4,869,940 | 9/1989 | Shoshani | 428/38 |
| 4,886,687 | 12/1989 | Malott | 428/4 |
| 4,888,260 | 12/1989 | Cowan | 430/1 |

Primary Examiner—Henry F. Epstein
Attorney, Agent, or Firm—Ralph W. Selitto, Jr.

[57] ABSTRACT

A decorative multi-colored material and method of making same using rainbow gratings simultaneously evidence different color patterns which change through the color spectrum. The patterns are formed from separate impressions from different portions of a common rainbow grating to provide color differentiation. The multi-colored material may be used for a variety of applications, for example, decorative package wrappings, stickers, product enhancement and the like.

38 Claims, 2 Drawing Sheets

MULTI-COLORED MATERIAL USING RAINBOW GRATING

BACKGROUND OF THE INVENTION

The present invention relates in general to multi-colored material, and more particularly, to decorative multi-colored images formed from rainbow gratings which simultaneously evidence a plurality of different colors having enhanced color separation.

Ruling and rainbow gratings are known materials which reflect a wide range of spectral colors. The common names of the observable pure spectral hues for the several wave length ranges are violet at between 3900–4550 angstroms, blue at between 4550–4920 angstrom green at between 4920–5770 angstroms, yellow at between 5770–5970 angstroms, orange at between 5970–6220 angstroms and red at between 6220–7700 angstroms. The different colors of the spectrum are observed by viewing surface portions of the grating at different angles of the incident light rays. Accordingly, by tilting the rainbow grating about its planar axis, the spectral colors of violet, blue, green, yellow, orange and red are subsequently observable.

Ruling gratings have been made by a number of methods over the years. Historically, a metal cylinder having a polished planar surface was processed in what was commonly referred to as a ruling engine. The ruling engine would inscribe the polished planar surface with a continuous groove having a resolution of approximately 1600 lines per inch. The resulting inscribed surface would be plated with a metal layer, for example, nickel, which upon removal from the inscribed surface would have one surface forming the grating. As the construction of a grating from a ruling engine was quite time consuming and expensive, an alternative method for producing a grating was developed.

In a rainbow grating, a glass master plate having a photo emulsion is inscribed by photographic means with the corresponding image of the rainbow grating, i.e., grooves, previously formed by the ruling engine. The use of photographic techniques was found to enhance the resolution of the rainbow grating by providing for a higher resolution of approximately 2400 lines per inch. Master plates of this type are available from Steve Provence Holography of Boulder Creek, Calif., Lasersmith of Chicago, Ill. and Light Impressions of Santa Cruz, Calif. The master plate is used to form a rainbow grating by plating a layer of nickel over a conductive silver layer from a suitable plating emulsion. The procedures for forming a rainbow grating by plating techniques from an emulsion are known from the manufactures thereof, i.e., using standard metal emulsion plating techniques and will not be described herein.

The resulting ruling or rainbow grating from either of the aforedescribed techniques have been used in similar ways to form decorative foils and the like. For example, a portion of the grating has been overlayed onto a die to form a repetitive pattern on the metalized surface of a polymer film. The resulting material has been decoratively used for wrapping of packages, lamination for miscellaneous products, labels and the like. Typically, the repetitive patterns have been geometric shapes, each portion of which evidencing identical color change upon change of the angle of incident of light to the viewer. Although these known techniques for the use of gratings have enhanced the use of decorative polymer films, such techniques have been limited in their ability to take advantage of the multiple color capability which these gratings evidence. To this end, the present invention provides decorative multi-colored materials using rainbow gratings which evidence independent color change so as to provide multiple color images to enhance the decorative nature and to extend the aesthetic utility of these materials.

SUMMARY OF THE INVENTION

One object of the present invention is to provide decorative multi-colored materials using rainbow gratings which provide decorative images having independent color changes in a way heretofore unknown in the use of prior rainbow gratings.

Another object of the present invention is to provide decorative multi-colored materials using rainbow gratings which are suitable for application in a variety of decorative areas, for example, wrapping of packages, laminated product decorations, hot stamping foils/roll leaf, labels and the like.

Another object of the present invention is to provide decorative multi-colored materials using rainbow gratings which are inexpensive to manufacture.

Another object of the present invention is to provide decorative multi-colored materials using rainbow gratings formed from high resolution emulsion plating techniques from a master plate having enhanced resolution.

In accordance with one embodiment of the present invention, there is disclosed a multi-colored material constructed of a first rainbow grating having a first orientation, a second rainbow grating having a second orientation different from the first orientation, whereby the first rainbow grating evidences a first color and the second rainbow grating simultaneously evidences a second color different from the first color.

In accordance with another embodiment of the present invention, there is disclosed a multi-colored material constructed of a first rainbow grating obtained from a first portion of a common rainbow grating, a second rainbow grating obtained from a second portion of the common rainbow grating different from the first portion, whereby the first rainbow grating evidences a first color and the second rainbow grating simultaneously evidences a second color different from the first color.

In accordance with another embodiment of the present invention, there is disclosed a method of making a multi-colored material including providing a common rainbow grating, forming a first rainbow grating as an impression of a first portion of the common rainbow grating on a first surface portion of a substrate, forming a second rainbow grating as an impression of a second portion of the common rainbow grating on a second surface portion of the substrate, the first portion of the common rainbow grating being different from the first portion, and forming an impression of the first and second rainbow gratings in a supporting material, whereby the first rainbow grating in the supporting material evidences a first color and the second rainbow grating in the supporting material simultaneously evidences a second color different from the first color.

BRIEF DESCRIPTION OF THE DRAWINGS

The above description, as well as further objects, features and advantages of the present invention will be more fully understood with reference to the following detailed description of the decorative multi-colored material using rainbow gratings, when taken in conjunction with the accompanying drawings, wherein.

DETAILED DESCRIPTION

Figure 1:
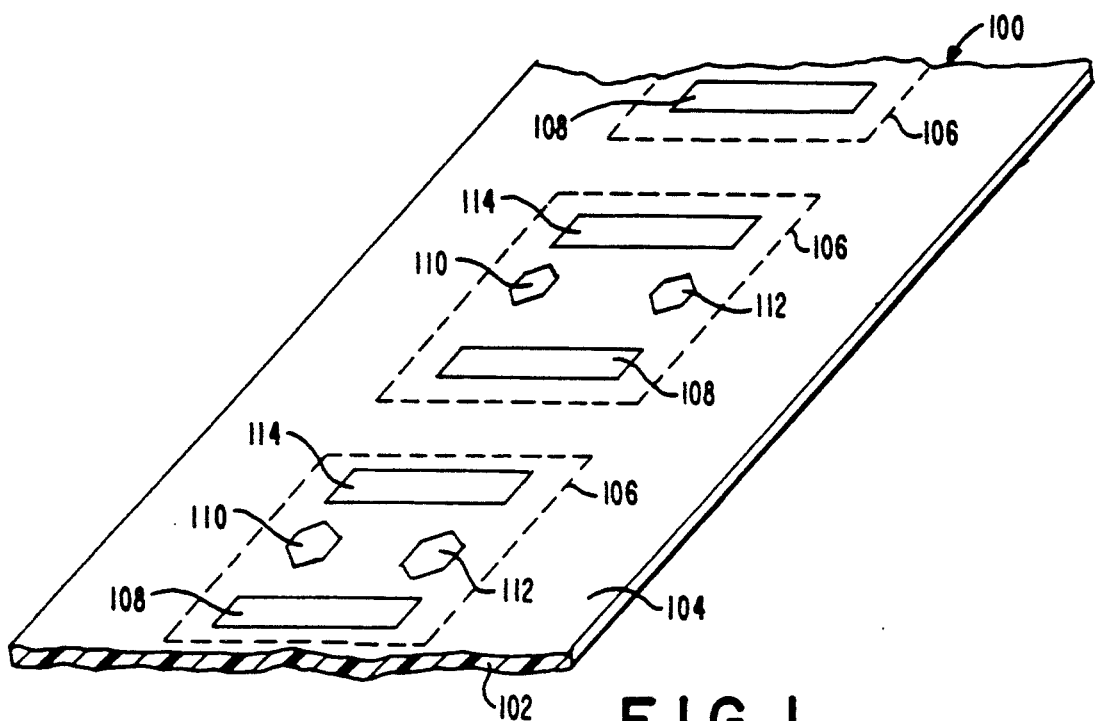
FIG. 1 is a perspective view of a portion of a continuous metalized polymer film having a repetitive pattern imprinted thereon using a rainbow grating, each portion of the pattern simultaneously evidencing different colors.

Referring now to the drawings, wherein like reference numerals represent like elements, there is shown in FIG. 1 a decorative multi-colored material generally designated by reference numeral 100. The material 100 includes a continuous transparent or translucent thin polymer layer 102 of, for example, polyester material. Other suitable materials for the polymer layer 102 may include, for example, polyethylene, polycarbonate, polystyrenes, vinyls, cellulosics and the like. The polymer layer 102 may also include various colorants. A thin metallic film 104 is deposited over the planar surface of the polymer layer 102. A variety of metals may be used for the metallic film 104, for example, aluminum, nickel, silver and the like. Imprinted on the metallic film 104 is a repetitive pattern 106 designated within the confines of the dashed lines. Each pattern 106, by way of illustration, is formed from a plurality of individual rainbow gratings 108,110,112 and 114. An adhesive layer (not shown) may be applied over the metallic film 104 to assist adherence of the individual patterns 106 in certain applications, for example, laminating, stickers, hot stamping applications, product decoration and the like.

For purposes of illustration only, the patterns 106 have been represented by rainbow gratings 108 and 114 in the shape of rectangles, while rainbow gratings 110 and 112 have been represented by hexagons. It is to be understood that other shapes and arrangements may be utilized in accordance with the present invention. For example, the patterns 106 may be in the form of animals, scenes, flowers, vehicles and the like, with each component thereof being formed as a separate or common rainbow grating. The complexity of each pattern 106 is therefore unlimited in scope upon application of the principles of the present invention. The patterns 106 may be arranged on the multi-colored material 100 in other than a single row, for example, in a matrix of rows and columns depending upon the size of the individual patterns and the size of the multicolored material. The patterns 106 may be individually separated from one another by severing using conventional techniques, such as die cutting and the like to provide individual multi-colored materials.

Figure 2:
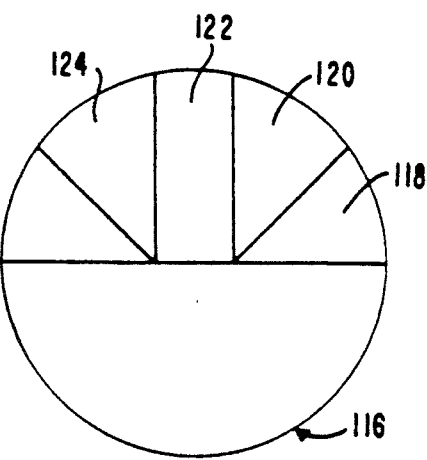
FIG. 2 is a plan view of a rainbow grating divided into multiple segments for use in fabricating the decorative multi-colored material shown in FIG. 1.

The process for making the decorative multicolored material 100 will now be described with respect to FIGS. 2 thru 7. Referring to FIG. 2, a rainbow grating 116 is fabricated as previously described utilizing a master plate, preferably obtained from Steve Provence Holography. The master plate supporting a photo emulsion containing the image of the rainbow grating is initially coated with a conductive silver layer. The silver layer may be applied by a variety of techniques, for example, spray coating, vacuum deposition and the like. A silver emulsion suitable for spraying is obtainable from Metaplast of Long Island, N.Y. The silver layer obtained by spray coating is applied to a thickness in the range of from about 1,000 to 5,000 angstroms. Preferably, the silver layer is applied by vacuum deposition to a thickness in the range of about 200 to 2,000 angstroms. Once the master plate has been made conductive by the silver layer, a nickel layer is plated onto the silver layer by standard emulsion plating techniques. The nickel layer is applied to a thickness in the range of from about 1 to 5 mils. Suitable nickel plating emulsion may be obtained from L. J. M. LaPlace of Elmwood Park, N.J. The resulting composite silver/nickel layer is stripped from the master plate to provide the rainbow grating 116.

The rainbow grating 116 is divided into a plurality of segments 118,120,122 and 124, each segment being capable of displaying a full range of spectral colors. Each segment 118,120,122 and 124 corresponds to a preselected rainbow grating 108,110,112 and 114 of the pattern 106. By designing each rainbow grating 108,110,112 and 114 to be made from a different orientation of segments 118,120,122 and 124, each rainbow grating of the pattern 106 will simultaneously evidence a different color. Upon rotation of the pattern 106 with respect to the viewer, each rainbow grating 108,110,112 and 114 will stepwise change color through the spectrum out of phase with the color change of the other rainbow gratings. As a result, each rainbow grating 108,110,112 and 114 will simultaneously evidence different colors when viewed at different orientations. Although the pattern 106 has been described as including four rainbow gratings 108,110,112 and 114, it is to be understood that a greater or lesser number of rainbow gratings may be employed as desired. In this regard, a corresponding less or greater number of segments 118,120,122 and 124 may be used in making the pattern 106.

Figure 3:
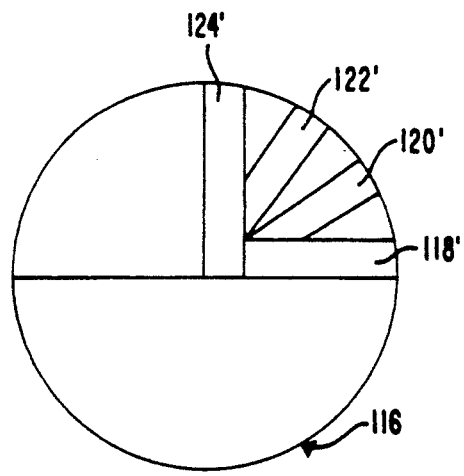
FIG. 3 is a plan view of a rainbow grating divided into multiple segments in accordance with another embodiment of the present invention for forming the decorative multi-colored material as shown in FIG. 1.

As shown in FIG. 2, the rainbow grating 116 is divided into segments 118,120,122 and 124. Each segment 118,120,122 and 124 when oriented differently will evidence a different initial color when viewed, for example, segment 118—orange, segment 120—green, segment 122—red and segment 124—yellow. Thus, the pattern 106 will simultaneously evidence four different colors. Each segment 118,120,122 and 124 is taken from a different angular portion, i.e., different orientation, of the rainbow grating 116. Specifically, segment 118 is oriented from about zero to 45°, segment 120 from about 45° to 90°, segment 122 about 90° and segment 124 from about 90° to 135°. It has been found that the greater the angular orientation difference between the segments 118,120,122 and 124, the greater sharpness or color separation is observed as the corresponding rainbow gratings 108,110,112 and 114 change colors. In this regard, as shown in FIG. 3, segments 118', 120', 122' and 124' are all taken from a 90° portion of the rainbow grating 116. As a result, less color differentiation is observed in the corresponding rainbow gratings 108,110,112 and 114 during color change through the spectrum. That is, the change of color from one to the other will be more gradual, i.e., the observed blending of colors from one to the other through different shades and hues. In either event, the rainbow gratings 108,110,112 and 114 will evidence a color change upon rotation of the pattern 106 in a stepwise fashion of about 2.5° to 15° for each color change.

Figure 4:
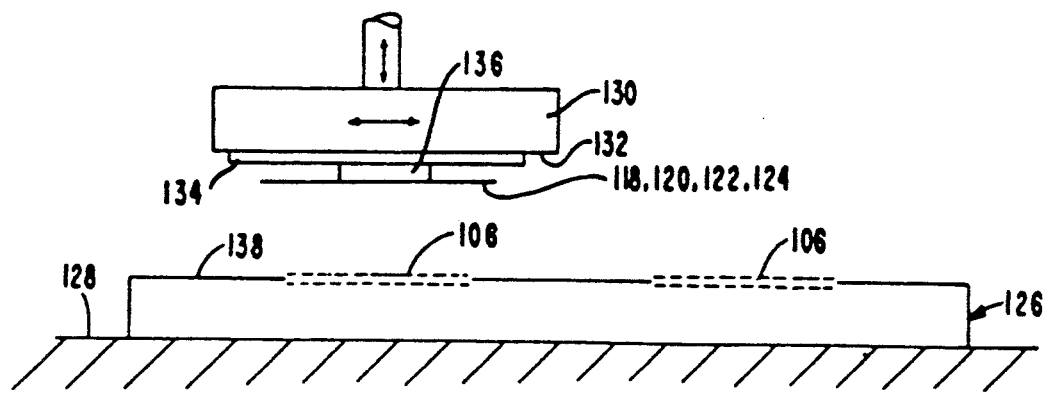
FIGS. 4 is a schematic illustration of a heated die apparatus used in fabricating decorative multi-colored material using rainbow gratings in accordance with the present invention.

Referring now to FIG. 4, a rigid plastic substrate 126 of preferably acrylic material, as well as other plastic such as polycarbonate, PVC and triacitate is supported on a support 128. The substrate 126 is positioned underlying an indexible heated platen 130 having a die receiving surface 132. A die 134 having a raised portion 136 conforming to the shape of a selected rainbow grating 108,110,112 and 114 of the pattern 106 is releasably mounted to the die receiving surface 132. A segment 118,120,122 or 124 ultimately corresponding to the desired rainbow grating 108,110,112 or 114 is positioned overlying the raised portion 136 and secured thereat by means not shown. The platen 130 is raised and lowered, as well as being indexed through X and Y coordinates, so as to contact the surface of the substrate 106 with a segment 118,120,122 or 124 of the rainbow grating 116 over an area corresponding to the shape of the raised portion 136 of the die 134.

A plurality of corresponding patterns 106 may be formed on the surface of the substrate 126, for example, in a matrix of rows and columns. Upon application of heat and pressure by means of the platen 130, an impression of the segments 118,120,122 and 124 are transferred to the surface of the substrate 126 to form the rainbow gratings 108,110,112 and 114. In this regard, after forming the rainbow grating 108 for each pattern 106 on the substrate 126, the die 134 is changed to one having a raised portion 136 corresponding to the shape, for example, of the rainbow grating 110. Subsequently, a different segment 118,120,122 or 124 of the rainbow grating 116 is used to provide a different initial color. This process is continued until each pattern 106 on the substrate 126 is formed with the rainbow gratings 108,110,112 and 114.

The basic process parameters for forming the rainbow gratings 108,110,112 and 114 on the surface of substrate 126 are die temperature, pressure and dwell time. It is to be understood that these parameters may be determined by trial and error. By way of example, typical die temperatures range from about 235° to 280° F., and preferably about 240° F. Operating pressures range from about 700-20,000 PSI, which pressures vary with the surface area of the raised portion 136 of the die 134. Dwell times typically range from 2 to 8 seconds. In considering the process parameters, it is generally required to heat the surface of the rigid plastic substrate 126 to its glass transition temperature. In considering the process parameters, it is known that excessive heat causes loss in the brightness of the colors produced by the rainbow gratings 108,110,112 and 114. Similarly, for sharper resolution of the images of the pattern 106, higher pressures and lower temperatures are employed.

In addition, it has generally been found that higher dwell times require the use of lower temperatures and vice versa. Based on the foregoing teaching, the process parameters of temperature, pressure and dwell time for any given pattern 106 may be determined to provide an optimum pattern 106 having good image definition and color brightness.

Figure 5:
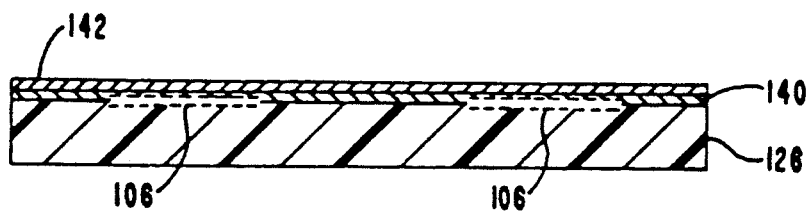
FIG. 5 is a cross-sectional view of a rigid plastic substrate having surface impressions of the rainbow grating formed by the heated die apparatus shown in FIG. 4 and subsequently plated with multiple metal layers.
Figure 6:
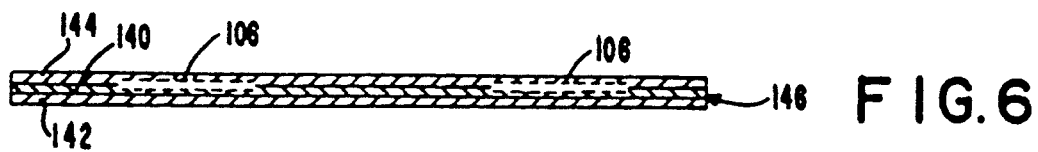
FIG. 6 is a cross-sectional view of a common rainbow grating as thus far fabricated for use in making the multi-colored material as shown in FIG. 1.

After completing the formation of the rainbow gratings 108,110,112 and 114 within the surface of the substrate 126, the substrate is removed from the support 128. Referring to FIG. 5, the surface 138 of the substrate 126 having the patterns 106 thereon is coated with a silver layer 140 such as by spray coating with a silver emulsion and subsequently air drying. Silver emulsions for forming a silver coating by spraying are known in the metallic coating industry, for example, as described above with respect to forming the rainbow grating 116, and will not be further described herein. Alternatively, the silver layer 140 may be applied by vacuum deposition techniques using known technology. The silver layer 140 will have a thickness in the range of from about 1,000 to 5,000 angstroms when using a silver emulsion, and from about 200 to 5,000 angstroms when using vacuum deposition techniques. After forming the silver layer 140, a nickel layer 142 is applied over the silver layer by conventional plating techniques from a nickel bath, for example, as described above with respect to forming the rainbow grating 116. The nickel layer will be in the range of from about 0.001 to 0.0015 inches. The resulting composite silver/nickel layers are stripped from the substrate 126 and the exposed surface of the silver layer 140 is likewise coated with a nickel layer 144 of from about 0.002 to 0.003 inches. As shown in FIG. 6, the resulting composite silver layer 140 and nickel layers 142 and 144 form a master rainbow grating 146 having multiple patterns 106 of the rainbow gratings 108,110,112 and 114 thereon.

Figure 7:
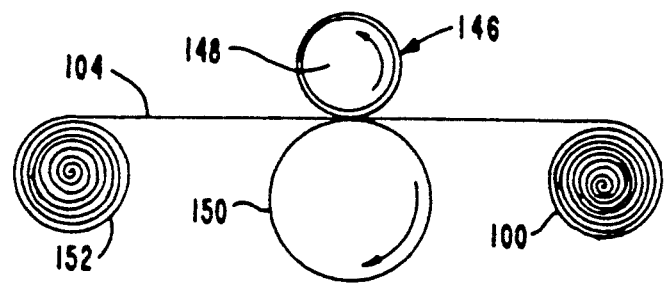
FIG. 7 is a schematic illustration of a continuous double press roll apparatus for use in fabricating the multi-colored material using the common rainbow grating as shown in FIG. 6.

Referring now to FIG. 7, the master rainbow grating 146 is attached about the circumferential surface of a first press roll 148 which is positioned juxtaposed a second press roll 150 to provide a nip therebetween. A continuous roll 152 of polyester material having an aluminum layer 104 of about 200-500 angstroms deposited on one surface thereof is supplied to the nip formed between the first and second press rolls 148,150. The aluminum layer 104, which functions like a mirror, may be formed by convention techniques such as plating, resistance evaporation, electron beam deposition and the like. The aluminum layer 104 is arranged facing the master rainbow grating 146. As the aluminum coated polyester material passes through the nip, the pressure created therein causes the master rainbow grating 146 to transfer images of the patterns 106 impressed into the aluminum layer 104 and polyester material so as to form the rainbow gratings 108,110,112 and 114 thereon as shown in FIG. 1.

In accordance with another embodiment of the present invention, images of the patterns 106 from the master rainbow grating 146 may be impressed directly into the polyester material. Subsequently, an aluminum layer 104 may be deposited over the surface of the polyester material having images of the pattern 106. The aluminum layer 104 may be formed by conventional techniques as noted above. This embodiment of the present invention provides greater brilliance to the resulting multi-colored material 100.

In accordance with still another embodiment, the continuous roll 152 of polyester material may be provided as a composite material including a second polymer layer having a lower glass transition temperature, for example, a polyester/vinyl acrylic composite. The composite polymer material may be processed in accordance with either embodiment as described above.

As previously described, the individual patterns 106 may be severed from the multi-colored material 100 to be used individually, for example, as stickers and the like, or the multi-colored material may be used as a whole for wrapping paper and the like. In addition, although the present invention has been described with respect to a particular pattern 106 and particular processing parameters, it is to be understood that these may be modified based upon the teachings herein.

Although the invention herein has been described with references to particular embodiments, it is to be understood that the embodiments are merely illustrative of the principles and application of the present invention. It is therefore to be understood that numerous modifications may be made to the embodiments and that other arrangements may be devised without departing from the spirit and scope of the present invention as defined by the claims.

What is claimed is:

1. A multi-colored material created from a multi-color producing rainbow grating comprising a support, a first rainbow grating provided on said support created from a portion of a multi-color producing rainbow grating having a first orientation for producing a first series of different colors viewable through 360°, a second rainbow grating provided on said support created from a portion of said multi-color producing rainbow grating having a second orientation different from said first orientation for producing a second series of different colors viewable through 360°, said first rainbow grating evidencing multi-colors of said first series and said second rainbow grating evidencing multi-colors of said second series simultaneously different from each other.

2. The material of claim 1, wherein said first and second rainbow gratings include impressions of different radial portions of a common rainbow grating.

3. The material of claim 2, wherein said different radial portions are in the range of at least about 30°–60° from each other.

4. The material of claim 2, wherein said different radial portions are at least about 45° from each other.

5. The material of claim 1, wherein said first rainbow grating is formed into a first pattern and said second rainbow grating is formed into a second pattern adjacent said first pattern.

6. The material of claim 1, wherein said first and second rainbow gratings are arranged in a common plane.

7. The material of claim 6, wherein said first and second rainbow gratings each evidence a color change upon tilting of said material at increments of about 2.5°–15° about an axis of said common plane.

8. The material of claim 1, further including a third rainbow grating having a third orientation different from said first and second orientations.

9. The material of claim 8, further including a fourth rainbow grating having a fourth orientation different from said first, second and third orientations.

10. The material of claim 9, wherein said first, second, third and fourth rainbow gratings include impressions of different radial portions of a common rainbow grating.

11. The material of claim 1, wherein the colors represented by said first series of colors produced by said first rainbow grating are the same as the colors represented by said second series of colors of said second rainbow grating.

12. The material of claim 1, wherein said multicolored material is opaque.

13. A multi-colored material created from a multicolor producing common rainbow grating comprising a support, a first rainbow grating provided on said support created as an impression of a first portion of a multi-color producing common rainbow grating, said first rainbow grating having a first orientation on said support for producing a first series of different colors viewable through 360°, a second rainbow grating provided on said support created as an impression of a second portion of a multi-color producing common rainbow grating, said second rainbow grating having a second orientation different from said first orientation for producing a second series of different colors viewable through 360°, said first rainbow grating evidencing multi-colors of said first series and said second rainbow grating evidencing multi-colors of said second series simultaneously different from each other.

14. The material of claim 13, wherein said first and second portions of said common rainbow grating include different radial portions thereof in the range of at least about 30°–60° from each other.

15. The material of claim 13, wherein said first and second portions of said common rainbow grating include different radial portions thereof in the range of at least about 45° from each other.

16. The material of claim 13, wherein said first rainbow grating is formed into a first pattern and said second rainbow grating is formed into a second pattern adjacent said first pattern.

17. The material of claim 13, wherein said first and second rainbow gratings are arranged in a common plane.

18. The material of claim 17, wherein said first and second rainbow gratings each evidence a color change upon tilting of said material at increments about 2.5°–15° about an axis of said common plane.

19. The material of claim 13, further including a third rainbow grating obtained from a third portion of said common rainbow grating different from said first and second portions and a fourth rainbow grating obtained from a fourth portion of said common rainbow grating different from said first, second and third portions.

20. The material of claim 18, wherein said first, second, third and fourth rainbow gratings include impressions of different radial portions of said common rainbow grating.

21. The multi-colored material of claim 13, wherein said first and second portions are obtained from a common portion of said multi-color producing common rainbow grating.

22. A method of making a multi-colored material comprising providing a common rainbow grating, creating a first rainbow grating as an impression of a first portion of said common rainbow grating on a first surface portion of a substrate, said first portion of said common rainbow grating having a first orientation on said substrate, creating a second rainbow grating as an impression of a second portion of said common rainbow grating on a second surface portion of said substrate, said second portion of said common rainbow grating having a second orientation on said substrate different from said first portion thereof, and forming an impression of said first and second rainbow gratings on a supporting material, whereby said first rainbow grating on the supporting material evidences a first series of colors viewable through 360° and said second rainbow grating on the supporting material evidences a second series of colors viewable through 360° simultaneously different from said first series of colors.

23. The method of claim 22, wherein creating an impression of said first rainbow grating on said first surface portion of said substrate comprises placing said first portion of said common rainbow grating overlying said first surface portion of said substrate, applying heat and pressure thereto, and removing said first portion of said common rainbow grating from contact with said first surface portion of said substrate, whereby an impression of said first rainbow grating is created on said first surface portion of said substrate.

24. The method of claim 23, wherein creating an impression of said second rainbow grating on said second surface portion of said substrate comprises placing said second portion of said common rainbow grating overlying said second surface portion of said substrate, applying heat and pressure thereto, and removing said second portion of said common rainbow grating from contact with said second surface portion of said substrate, whereby an impression of said second rainbow grating is created on said second surface portion of said substrate.

25. The method of claim 24, further including creating an impression of each of said first and second rainbow gratings on a plurality of surface portions of said substrate.

26. The method of claim 25, further including creating a corresponding plurality of first and second rainbow gratings on said supporting material.

27. The method of claim 22, wherein said first and second rainbow gratings include impressions of different radial portion of said common rainbow grating.

28. The method of claim 27, wherein said different radial portions are in the range of at least about 30°-60° from each other.

29. The method of claim 27, wherein said different radial portions are at least about 45° from each other.

30. The method of claim 22, wherein said first and second rainbow gratings each evidence a color change upon tilting of said supporting material at increments of about 2.5°-15° about an axis of a common plane containing said first and second rainbow gratings.

31. The method of claim 22, further including a third rainbow grating different from said first and second rainbow gratings and a fourth rainbow grating different from said first, second and third rainbow gratings.

32. The method of claim 31, wherein said first, second, third and fourth rainbow gratings include impressions of different radial portions of said common rainbow grating.

33. The method of claim 22, wherein said creating an impressing of said first and second rainbow gratings on said supporting material includes forming a metal layer over said substrate including said first and second surface portions, and removing said metal layer therefrom, whereby said metal layer includes an impression of said first and second rainbow gratings.

34. The method of claim 33, wherein said creating an impression of said first and second rainbow gratings on said supporting material further includes creating an impression of said first and second rainbow gratings on said supporting material using said metal layer upon application of heat and pressure thereto.

35. The method of claim 34, further including coating the surface of said supporting material with a metal layer to receive said impression of said first and second rainbow gratings.

36. A multi-colored material having a predetermined pattern created from a multi-color producing rainbow grating, said material comprising a support, a first rainbow grating forming a portion of said pattern provided on said support created as an impression of a portion of said multi-color producing rainbow grating, said first rainbow grating having a first orientation on said support for producing a first series of different visible colors viewable through 360°, a second rainbow grating forming another portion of said pattern provided on said support created as an impression of a portion of said multi-color producing rainbow grating, said second rainbow grating having a second orientation on said support different from said first orientation for producing a second series of different visible colors viewable through 360°, said first rainbow grating sequentially evidencing multi-colors of said first series and said second rainbow grating sequentially evidence multi-colors of said second series simultaneously different from each other than viewed through 360°.

37. The multi-colored material of claim 36, wherein said first and second rainbow gratings from portions of said pattern adjacent one another.

38. The multi-colored material of claim 36, wherein said first and second orientations differ by at least about 2.5°.

* * * * *